United States Patent
Zheng

(10) Patent No.: US 12,475,077 B2
(45) Date of Patent: Nov. 18, 2025

(54) ELECTRONIC CIRCUIT THAT RENDERS A CHANGED FPGA USABLE WITHOUT CHANGING FIRMWARE

(71) Applicant: TOSHIBA TEC KABUSHIKI KAISHA, Tokyo (JP)

(72) Inventor: Zhichao Zheng, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 18/495,785

(22) Filed: Oct. 27, 2023

(65) Prior Publication Data
US 2024/0248873 A1 Jul. 25, 2024

(30) Foreign Application Priority Data
Jan. 23, 2023 (JP) ................................ 2023-008210

(51) Int. Cl.
*G06F 15/78* (2006.01)
*G06F 13/42* (2006.01)

(52) U.S. Cl.
CPC ...... *G06F 15/7871* (2013.01); *G06F 13/4282* (2013.01); *G06F 15/786* (2013.01)

(58) Field of Classification Search
CPC . G06F 15/7871; G06F 13/4282; G06F 15/786
See application file for complete search history.

(56) References Cited

U.S. PATENT DOCUMENTS

| | | | | |
|---|---|---|---|---|
| 4,851,720 A | * | 7/1989 | Pathak | H03K 19/0016 365/208 |
| 6,034,542 A | * | 3/2000 | Ridgeway | H03K 19/177 326/38 |
| 6,948,147 B1 | * | 9/2005 | New | G06F 30/34 716/117 |
| 7,030,646 B1 | * | 4/2006 | Tyson | H03K 19/17748 326/38 |
| 7,451,243 B2 | * | 11/2008 | Coleman | H04L 12/40032 710/10 |
| 7,822,958 B1 | * | 10/2010 | Allen | G06F 9/4401 713/1 |
| 9,524,177 B2 | * | 12/2016 | Ito | G06F 9/4406 |
| 10,048,863 B1 | * | 8/2018 | Goss | G06F 3/0619 |
| 2007/0058414 A1 | * | 3/2007 | Hoya | G06F 11/1044 714/E11.041 |

(Continued)

FOREIGN PATENT DOCUMENTS

JP 3660219 3/2005

*Primary Examiner* — Faisal M Zaman
(74) *Attorney, Agent, or Firm* — Amin, Turocy & Watson, LLP

(57) ABSTRACT

Provided is an electronic circuit that makes a changed FPGA usable without changing firmware. The electronic circuit includes: a processor; a first field-programmable gate array (FPGA); a first generation circuit; and a second generation circuit. The first FPGA executes configuration according to first bitstream data before the processor is activated. The first generation circuit outputs a first reset signal that resets the processor to the processor based on a first completion signal indicating that the configuration is completed. The second generation circuit outputs a second completion signal indicating that the configuration is completed to the processor based on a control signal output from the processor.

12 Claims, 2 Drawing Sheets

(56) References Cited

U.S. PATENT DOCUMENTS

| | | | |
|---|---|---|---|
| 2007/0208926 A1* | 9/2007 | Grieve | G06F 9/4401 |
| | | | 713/1 |
| 2012/0260078 A1* | 10/2012 | Varnum | G06F 15/7871 |
| | | | 713/2 |
| 2014/0032794 A1* | 1/2014 | Kanigicherla | G06F 13/28 |
| | | | 710/28 |
| 2014/0244981 A1* | 8/2014 | Okada | G06F 15/7867 |
| | | | 712/220 |
| 2019/0361821 A1* | 11/2019 | Ryu | G06F 3/0659 |
| 2020/0334384 A1* | 10/2020 | Meng | G06F 9/542 |
| 2021/0004165 A1* | 1/2021 | Benisty | G06F 3/0661 |
| 2021/0096838 A1* | 4/2021 | Samuel | G06F 21/572 |
| 2021/0294615 A1* | 9/2021 | Xiang | G06F 13/4282 |

\* cited by examiner

ELECTRONIC CIRCUIT THAT RENDERS A CHANGED FPGA USABLE WITHOUT CHANGING FIRMWARE

CROSS-REFERENCE TO RELATED APPLICATION

This application is based upon and claims the benefit of priority from Japanese Patent Application No. 2023-008210, filed Jan. 23, 2023, the entire contents of which are incorporated herein by reference.

FIELD

Exemplary embodiments described herein relate to an electronic circuit.

BACKGROUND

In the related art, when a design change in which a field-programmable gate array (FPGA) mounted on an electronic circuit is changed to a different FPGA is made, a size of bitstream data loaded into the FPGA, time taken for loading, or the like changes. Therefore, it is necessary to change firmware that controls loading of the bitstream data into the FPGA.

However, a large number of development steps are required for changing the firmware.

DETAILED DESCRIPTION

In general, according to one embodiment, an electronic circuit that makes a changed FPGA usable without changing firmware is provided.

An electronic circuit according to an embodiment includes: a processor; a first field-programmable gate array (FPGA); a first generation circuit; and a second generation circuit. The first FPGA executes configuration according to first bitstream data before the processor is activated. The first generation circuit outputs a first reset signal that resets the processor to the processor based on a first completion signal indicating that the configuration is completed. The second generation circuit outputs a second completion signal indicating that the configuration is completed to the processor based on a control signal output from the processor.

Hereinafter, an embodiment of an electronic circuit will be described in detail with reference to the accompanying drawings. The embodiment described below is the embodiment of the electronic circuit, and does not limit a configuration, specification, and the like thereof.

Figure 1:
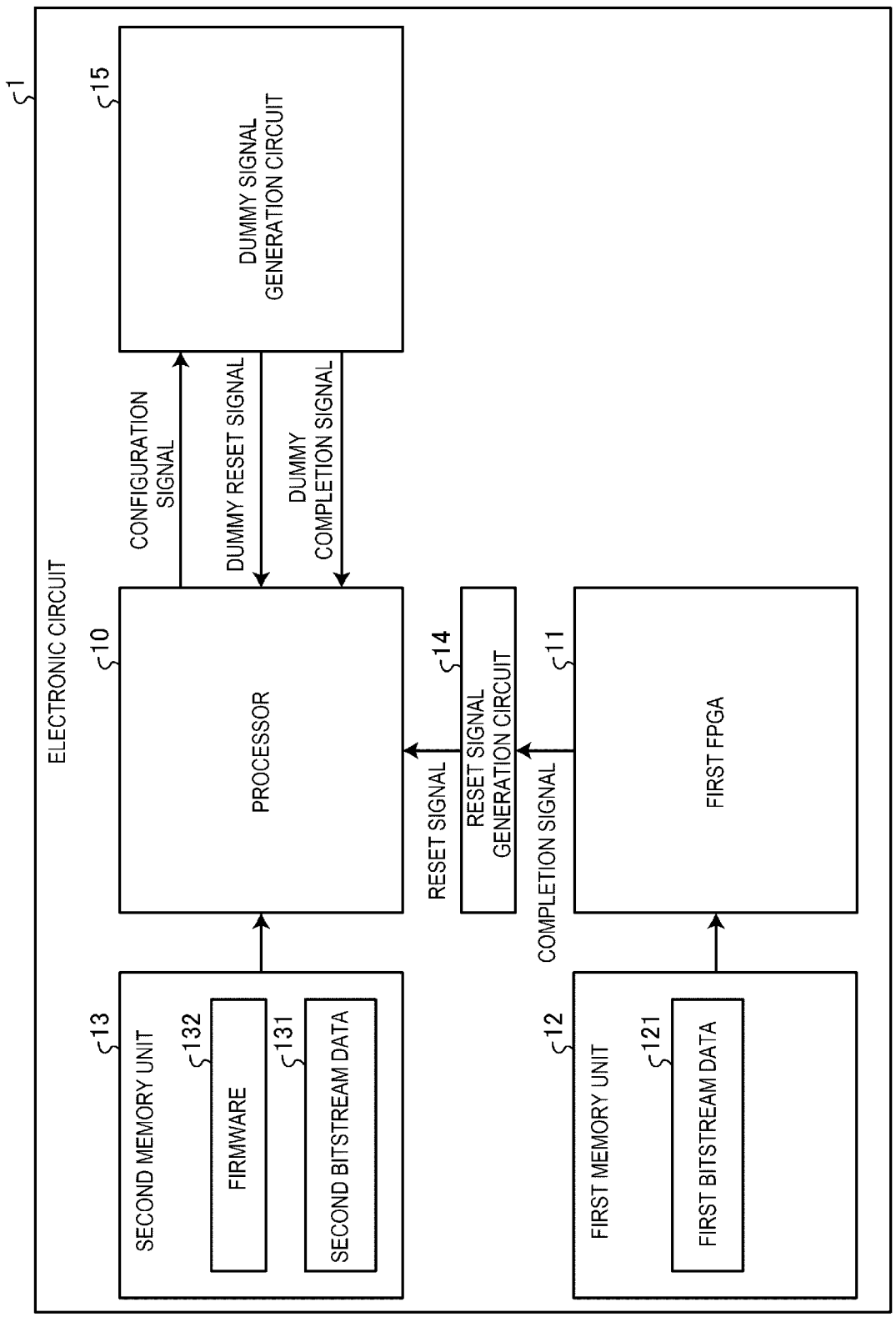
FIG. 1 is a block diagram showing an example of an electronic circuit according to the present embodiment.

FIG. 1 is a block diagram showing an example of an electronic circuit 1 according to the present embodiment. The electronic circuit 1 includes a processor 10, a first field-programmable gate array (FPGA) 11, a first memory unit 12, a second memory unit 13, a reset signal generation circuit 14, and a dummy signal generation circuit 15. Although the electronic circuit 1 includes a second FPGA (not shown), the electronic circuit 1 includes a first FPGA 11 instead of the second FPGA due to a design change.

The processor 10 is a processing circuit that controls the electronic circuit 1. For example, the processor 10 is a processing circuit such as a central processing unit (CPU). The processor 10 is not limited to the CPU, and may be another processing circuit.

The processor 10 executes processing according to a processing procedure indicated in firmware 132. The processor 10 activates the electronic circuit 1 by operating according to the firmware 132.

More specifically, when reset of the processor 10 is completed, the processor 10 outputs, to the dummy signal generation circuit 15, a configuration signal that instructs execution of configuration based on second bitstream data 131. The configuration signal is an example of a control signal.

The first FPGA 11 is an integrated circuit that constitutes logic designated by a hardware description language (HDL) or the like. Further, the first FPGA 11 is an FPGA having a type different from that of the second FPGA before the design change. That is, the first FPGA 11 is an FPGA changed by the design change.

Further, the first FPGA 11 executes configuration according to first bitstream data 121 before the processor 10 is activated. More specifically, the first FPGA 11 is connected to the first memory unit 12 by a serial peripheral interface (SPI). Further, the first FPGA 11 is set in a master SPI mode when a fixed value is input to a specific input terminal. That is, the first FPGA 11 is set in a mode in which the first bitstream data 121 stored in the first memory unit 12 is read. The first FPGA 11 reads the first bitstream data 121 stored in the first memory unit 12.

The first FPGA 11 executes configuration of loading the first bitstream data 121 read from the first memory unit 12. When the configuration is completed, the first FPGA 11 outputs a completion signal to the reset signal generation circuit 14.

The first memory unit 12 is implemented by a memory medium such as a flash read only memory (ROM). The first memory unit 12 stores the first bitstream data 121.

The first bitstream data 121 is data loaded into the first FPGA 11. In other words, the first bitstream data 121 is data in which logic is expressed by the HDL or the like.

The second memory unit 13 is implemented by a memory medium such as a flash ROM. The second memory unit 13 stores the firmware 132 and the second bitstream data 131.

The firmware 132 is software for controlling the electronic circuit 1. Here, the firmware 132 includes a program for controlling activation of the second FPGA. However, when the firmware 132 is changed to be applied to the first FPGA 11, a large number of development steps are required. Therefore, the electronic circuit 1 makes the first FPGA 11 usable by hardware without changing the firmware 132.

The second bitstream data 131 is bitstream data created for the second FPGA before the first FPGA 11 is changed due to the design change. In other words, the second bitstream data 131 is data in which logic is expressed by the HDL or the like.

The reset signal generation circuit 14 is a circuit that generates a reset signal that resets the processor 10. The reset signal generation circuit 14 outputs, to the processor 10, the reset signal that resets the processor 10 based on the completion signal indicating that the configuration is completed. The completion signal is an example of a first completion signal. The reset signal generation circuit 14 is an example of a first generation circuit. The reset signal is an example of a first reset signal.

The dummy signal generation circuit 15 generates a dummy reset signal and a dummy completion signal. Here, in a case of the second FPGA, the processor 10 uses the second bitstream data 131 stored in the second memory unit 13 to execute the configuration. When the configuration is completed, the processor 10 receives input of the completion signal from the second FPGA. Further, when the second FPGA is reset, the processor 10 receives input of the reset signal from the second FPGA.

However, the first FPGA 11 is activated earlier than the processor 10. The processor 10 is reset after the configuration of the first FPGA 11 is completed. As the second FPGA is changed to the first FPGA 11, a timing at which the reset signal and the completion signal are generated changes. Therefore, the signals may not be input to the processor 10. Therefore, the dummy signal generation circuit 15 generates the dummy reset signal and the dummy completion signal that are dummy signals. The dummy signal generation circuit 15 outputs the signals to the processor 10.

More specifically, the dummy signal generation circuit 15 receives input of the configuration signal that instructs execution of the configuration from the processor 10. The dummy signal generation circuit 15 outputs, to the processor 10, the dummy completion signal indicating that the configuration is completed based on the configuration signal output from the processor 10. The dummy completion signal is an example of a second completion signal. The dummy signal generation circuit 15 is an example of a second generation circuit. Further, the dummy completion signal is a dummy signal. That is, the dummy completion signal is a signal that disguises completion of the configuration.

The dummy signal generation circuit 15 outputs the dummy completion signal to the processor 10 when a first specified period elapses after the configuration signal is input. The first specified period is, for example, a period required for the configuration in the second FPGA.

The dummy signal generation circuit 15 outputs, to the processor 10, the dummy reset signal indicating that the first FPGA 11 is reset when a second specified period elapses after the dummy completion signal is output. The dummy reset signal is a dummy signal. That is, the dummy reset signal is a signal that disguises the reset of the first FPGA 11. Further, the dummy reset signal is an example of a second reset signal. The second specified period is, for example, a period required from the configuration completion to the reset in the second FPGA.

Figure 2:
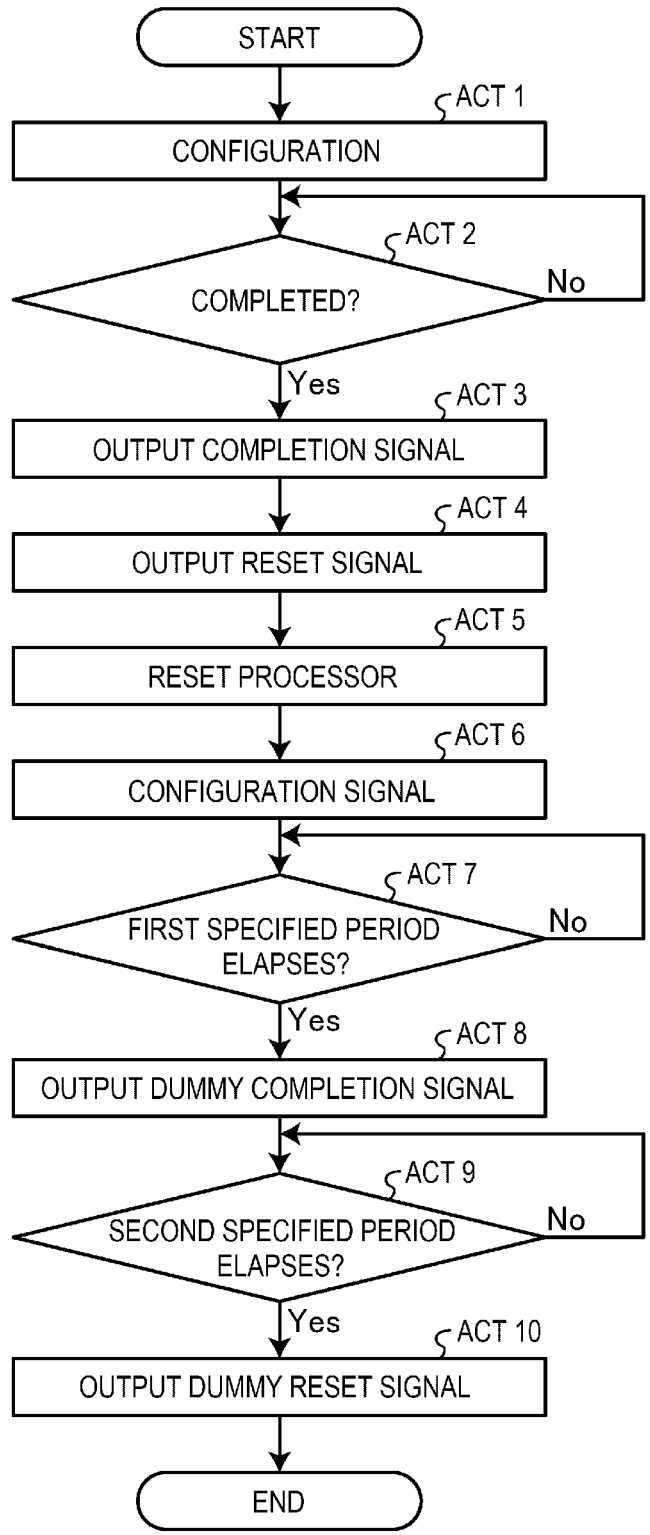
FIG. 2 is a flowchart showing an example of activation executed by the electronic circuit.

Next, activation executed by the electronic circuit 1 will be described. FIG. 2 is a flowchart showing an example of the activation executed by the electronic circuit 1 according to the present embodiment.

The first FPGA 11 executes configuration of loading the first bitstream data 121 read from the first memory unit 12 (ACT 1).

The first FPGA 11 determines whether the configuration is completed (ACT 2). When the configuration is not completed (ACT 2; No), the first FPGA 11 waits.

When the configuration is completed (ACT 2; Yes), the first FPGA 11 outputs, to the reset signal generation circuit 14, the completion signal indicating that the configuration is completed (ACT 3).

The reset signal generation circuit 14 outputs, to the processor 10, the reset signal that resets the processor 10 (ACT 4).

The processor 10 is reset when the reset signal is input (ACT 5). Further, the processor 10 outputs, to the dummy signal generation circuit 15, the configuration signal that instructs execution of the configuration (ACT 6).

The dummy signal generation circuit 15 determines whether the first specified period elapses after the configuration signal is input (ACT 7). When the first specified period does not elapse (ACT 7; No), the dummy signal generation circuit 15 waits.

When the first specified period elapses (ACT 7; Yes), the dummy signal generation circuit 15 outputs the dummy completion signal to the processor 10 (ACT 8).

The dummy signal generation circuit 15 determines whether the second specified period elapses after the dummy completion signal is output (ACT 9). When the second specified period does not elapse (ACT 9; No), the dummy signal generation circuit 15 waits.

When the second specified period elapses (ACT 9; Yes), the dummy signal generation circuit 15 outputs the dummy reset signal to the processor 10 (ACT 10).

As described above, the electronic circuit 1 ends the activation.

As described above, the electronic circuit 1 according to the present embodiment includes: the processor 10; the changed first FPGA 11 changed due to the design change; the reset signal generation circuit 14; and the dummy signal generation circuit 15. The first FPGA 11 reads the first bitstream data 121 before the processor 10 is activated. When the configuration of the first FPGA 11 is completed, the reset signal generation circuit 14 outputs the reset signal that resets the processor 10 to the processor 10. The dummy signal generation circuit 15 outputs, to the processor 10, the dummy completion signal that disguises the completion of the configuration of the first FPGA 11.

As described above, as the change is performed from the second FPGA to the first FPGA 11 due to the design change, the first FPGA 11 executes the configuration before the processor 10 is activated. Therefore, the processor 10 cannot receive input of the completion signal indicating that the configuration of the first FPGA 11 is completed, but receives input of the dummy completion signal from the dummy signal generation circuit 15.

Accordingly, the electronic circuit 1 performs the processing procedure the same as that in the case of the second FPGA before being changed to the first FPGA 11 in a pseudo manner. In other words, the electronic circuit 1 makes an input and output relationship of the processor 10 the same in a pseudo manner. Since the input and output relationship is the same, the processor 10 can execute processing according to the processing procedure indicated in the firmware 132. Therefore, the electronic circuit 1 can make the changed first FPGA 11 usable without changing the firmware 132.

While several embodiments of the exemplary embodiment have been described, the embodiments have been presented by way of example and are not intended to limit the scope of the exemplary embodiment. The novel embodiments can be performed in various other forms, and various omissions, replacements, and changes can be made in a scope not departing from the gist of the exemplary embodiments. The embodiments and the modifications thereof are included in the scope and the gist of the exemplary embodiments, and are included in a scope of the exemplary embodiments disclosed in the claims and equivalents thereof.

The program executed by each device in the embodiment and the modification described above is provided by being incorporated in advance in a memory medium (the ROM or the memory unit) provided in each device, but is not limited thereto. For example, the program may be provided by being recorded in a computer-readable recording medium such as a CD-ROM, a flexible disk (FD), a CD-R, or a digital versatile disk (DVD) in a file in an installable or executable format. Further, the memory medium is not limited to a medium independent of the computer or an incorporation system, and also includes a memory medium in which a program transmitted by a LAN, the internet, or the like is stored or temporarily stored by being downloaded.

The program executed by each device in the embodiment and the modification described above may be stored in a computer connected to a network such as the Internet and provided by being downloaded via the network, or may be provided or distributed via the network such as the Internet.

What is claimed is:

1. An electronic circuit, comprising:
a processor;
a first field-programmable gate array (FPGA) configured to execute configuration according to first bitstream data before the processor is activated;
a first generation circuit configured to output a first reset signal that resets the processor to the processor based on a first completion signal indicating that the configuration is completed; and
a second generation circuit configured to output a second completion signal indicating that the configuration is completed to the processor based on a control signal output from the processor, wherein
the first FPGA is set in a mode of reading the first bitstream data stored in a first memory component
the electronic circuit further comprising a second memory component configured to store second bitstream data, wherein the first FPGA executes the configuration of loading the first bitstream data read from the first memory component, wherein
the processor outputs, to the second generation circuit, the control signal that instructs execution of configuration based on the second bitstream data, and wherein
when a specified period elapses after the second completion signal is output, the second generation circuit outputs, to the processor, a second reset signal indicating that the first FPGA is reset.

2. The electronic circuit according to claim 1, wherein the processor is a central processing unit, the first memory component is a read only memory, and the second memory component is a read only memory.

3. The electronic circuit according to claim 1, wherein the first FPGA is connected to the first memory component by a serial peripheral interface.

4. The electronic circuit according to claim 1, wherein the first FPGA is set in a master mode when a fixed value is input to a specific input terminal.

5. The electronic circuit according to claim 1, wherein the second generation circuit is further configured to generate a dummy reset signal and a dummy completion signal.

6. The electronic circuit according to claim 1, wherein the second generation circuit is further configured to output a dummy completion signal to the processor when a first specified period elapses after a configuration signal is input.

7. A method for an electronic circuit, comprising:
executing configuration using a first field-programmable gate array (FPGA) according to first bitstream data before a processor is activated;
outputting, using a first generation circuit, a first reset signal that resets the processor to the processor based on a first completion signal indicating that the configuration is completed;
outputting, using a second generation circuit, a second completion signal indicating that the configuration is completed to the processor based on a control signal output from the processor;
setting the first FPGA in a mode of reading the first bitstream data stored in a first memory component;
storing second bitstream data in a second memory component; and
executing, by the first FPGA, the configuration of loading the first bitstream data read from the first memory component;
outputting, to the second generation circuit, the control signal that instructs execution of configuration based on the second bitstream data; and
when a specified period elapses after the second completion signal is output, outputting to the processor a second reset signal indicating that the first FPGA is reset.

8. The method according to claim 7, further comprising:
connecting the first FPGA to the first memory component by a serial peripheral interface.

9. The method according to claim 7, further comprising:
setting the first FPGA in a master mode when a fixed value is input to a specific input terminal.

10. The method according to claim 7, further comprising:
generating, by the second generation circuit, a dummy reset signal and a dummy completion signal.

11. A method of making a changed first field- programmable gate array (FPGA) usable without changing related firmware, comprising:
executing configuration using a first FPGA according to first bitstream data before a processor is activated;
outputting, using a first generation circuit, a first reset signal that resets the processor to the processor based on a first completion signal indicating that the configuration is completed;
outputting, using a second generation circuit, a second completion signal indicating that the configuration is completed to the processor based on a control signal output from the processor; and
when a specified period elapses after the second completion signal is output, outputting to the processor a second reset signal indicating that the first FPGA is reset.

12. The method according to claim 11, further comprising:
setting the first FPGA in a mode of reading the first bitstream data stored in a first memory component.

* * * * *